(12) United States Patent
Fuhr et al.

(10) Patent No.: US 9,774,020 B2
(45) Date of Patent: *Sep. 26, 2017

(54) LITHIUM ION BATTERY MODULE HAVING A COMPARTMENTALIZED HOUSING

(71) Applicant: Johnson Controls Advanced Power Solutions LLC, Wilmington, DE (US)

(72) Inventors: Jason D. Fuhr, Sussex, WI (US); Gary P. Houchin-Miller, Fox Point, WI (US); Gerald K. Bowen, Cedarbury, WI (US); John P. Dinkelman, South Milwaukee, WI (US); Dharmendra Patel, Menomonee Falls, WI (US); Alex Molinaroli, Brookfield, WI (US)

(73) Assignee: Johnson Controls Advanced Power Solutions LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/048,754

(22) Filed: Feb. 19, 2016

(65) Prior Publication Data

US 2016/0172643 A1 Jun. 16, 2016

Related U.S. Application Data

(63) Continuation of application No. 14/930,443, filed on Nov. 2, 2015, now Pat. No. 9,577,231, which is a
(Continued)

(51) Int. Cl.
*H01M 6/46* (2006.01)
*H01M 2/10* (2006.01)
(Continued)

(52) U.S. Cl.
CPC ....... *H01M 2/1077* (2013.01); *H01M 2/0242* (2013.01); *H01M 2/0245* (2013.01);
(Continued)

(58) Field of Classification Search
CPC ............. H01M 2/1077; H01M 2/0245; H01M 2/0275; H01M 2/0242; H01M 2/0262;
(Continued)

(56) References Cited

U.S. PATENT DOCUMENTS 3,485,678 A 12/1969 Biaich et al.
4,346,151 A 8/1982 Uba et al.
(Continued)

FOREIGN PATENT DOCUMENTS

DE 102007063194 A1 6/2009
EP 0654180 5/1996
(Continued)

OTHER PUBLICATIONS

PCT Publication No. WO/2010/135456 A3 (PCT/US2010/035451) published Nov. 25, 2010 including Written Opinion and International Search Report; 47 pages.
(Continued)

*Primary Examiner* — Raymond Alejandro
(74) *Attorney, Agent, or Firm* — Fletcher Yoder, P.C.

(57) ABSTRACT

A lithium-ion battery module includes a housing having a plurality of partitions configured to define a plurality of compartments within a housing. The battery module also includes a lithium-ion cell element provided in each of the compartments of the housing. The battery module further includes a cover coupled to the housing and configured to route electrolyte into each of the compartments. The cover is also configured to seal the compartments of the housing.

20 Claims, 9 Drawing Sheets

Related U.S. Application Data continuation of application No. 13/300,300, filed on Nov. 18, 2011, now Pat. No. 9,209,483, which is a continuation of application No. PCT/US2010/035451, filed on May 19, 2010.

(60) Provisional application No. 61/180,043, filed on May 20, 2009.

(51) Int. Cl.

| | | |
|---|---|---|
| *H01M 2/02* | (2006.01) | |
| *H01M 2/04* | (2006.01) | |
| *H01M 2/38* | (2006.01) | |
| *H01M 10/052* | (2010.01) | |
| *H01M 10/058* | (2010.01) | |
| *H01M 2/36* | (2006.01) | |
| *H01M 10/0525* | (2010.01) | |

(52) U.S. Cl.
CPC ....... *H01M 2/0262* (2013.01); *H01M 2/0275* (2013.01); *H01M 2/0277* (2013.01); *H01M 2/0285* (2013.01); *H01M 2/0292* (2013.01); *H01M 2/043* (2013.01); *H01M 2/0456* (2013.01); *H01M 2/0486* (2013.01); *H01M 2/1072* (2013.01); *H01M 2/362* (2013.01); *H01M 2/38* (2013.01); *H01M 10/052* (2013.01); *H01M 10/058* (2013.01); *H01M 10/0525* (2013.01); *H01M 2002/0297* (2013.01); *H01M 2220/20* (2013.01); *Y02E 60/122* (2013.01); *Y02T 10/7011* (2013.01); *Y10T 137/4757* (2015.04)

(58) Field of Classification Search
CPC ............. H01M 2/0277; H01M 2/0285; H01M 2/0292; H01M 2/043; H01M 2/0456; H01M 2/0486; H01M 2/1072; H01M 2/362; H01M 2/38; H01M 10/052; H01M 10/0525; H01M 10/058; H01M 2220/20; Y02E 60/122
See application file for complete search history.

(56) References Cited

U.S. PATENT DOCUMENTS

| | | |
|---|---|---|
| 5,208,117 A | 5/1993 | Uemichi et al. |
| 5,609,972 A | 3/1997 | Kaschmitter et al. |
| 6,066,411 A | 5/2000 | Liu |
| 6,255,015 B1 | 7/2001 | Corrigan et al. |
| 6,524,741 B1 | 2/2003 | Bryan |
| 6,653,017 B2 | 11/2003 | Satoh et al. |
| 7,186,477 B2 | 3/2007 | Lei |
| 7,205,067 B2 | 4/2007 | Godevais et al. |
| 7,358,009 B2 | 4/2008 | Johnson et al. |
| 7,572,544 B2 | 8/2009 | Kozuki et al. |
| 7,572,549 B2 | 8/2009 | Wegner |
| 7,824,806 B2 | 11/2010 | Visco et al. |
| 7,855,011 B2 | 12/2010 | Meschter |
| 8,021,774 B2 | 9/2011 | Woo |
| 8,088,509 B2 | 1/2012 | Shen et al. |
| 8,105,711 B2 | 1/2012 | Muraoka et al. |
| 8,119,274 B2 | 2/2012 | Park et al. |
| 8,182,935 B2 | 5/2012 | Alkemade et al. |
| 8,367,239 B2 | 2/2013 | Hermann |
| 8,541,126 B2 | 9/2013 | Hermann et al. |
| 8,563,154 B2 | 10/2013 | Graban et al. |
| 8,568,916 B2 | 10/2013 | Nakai et al. |
| 8,785,026 B2 | 7/2014 | Hu et al. |
| 8,916,282 B1 | 12/2014 | Bohman et al. |
| 8,999,538 B2 | 4/2015 | Fuhr et al. |
| 9,012,055 B2 | 4/2015 | Utterman et al. |
| 9,040,190 B2 | 5/2015 | Kim et al. |
| 9,209,483 B2 * | 12/2015 | Fuhr ................... H01M 2/0262 |
| 9,287,536 B2 | 3/2016 | Waters |
| 2002/0012833 A1 | 1/2002 | Gow et al. |
| 2003/0194608 A1 * | 10/2003 | Hirai ................... H01M 2/32 429/178 |
| 2004/0018425 A1 | 1/2004 | Kejha et al. |
| 2004/0247995 A1 * | 12/2004 | Devitt ................. H01M 2/0242 429/66 |
| 2005/0037260 A1 | 2/2005 | Shen |
| 2007/0154795 A1 * | 7/2007 | Kim ................... H01M 10/0525 429/162 |
| 2008/0311469 A1 * | 12/2008 | Kim ..................... H01M 2/021 429/185 |
| 2009/0047574 A1 | 2/2009 | Hellmann |
| 2010/0055556 A1 | 3/2010 | Meschter |
| 2010/0190081 A1 | 7/2010 | Park et al. |
| 2010/0255359 A1 | 10/2010 | Hirakawa et al. |
| 2010/0310911 A1 | 12/2010 | Yamamoto et al. |
| 2011/0027641 A1 | 2/2011 | Rejman |
| 2011/0151310 A1 | 6/2011 | Pyszczek |
| 2011/0236741 A1 | 9/2011 | Chew et al. |
| 2012/0003523 A1 | 1/2012 | Schaller et al. |
| 2012/0308863 A1 | 12/2012 | Masumoto et al. |
| 2013/0130078 A1 | 5/2013 | Schaefer et al. |
| 2013/0316209 A1 | 11/2013 | Masumoto et al. |
| 2014/0186693 A1 | 7/2014 | Tyler et al. |
| 2014/0377607 A1 | 12/2014 | Urano |
| 2015/0044539 A1 | 2/2015 | Li |
| 2015/0140418 A1 | 5/2015 | Duffield et al. |
| 2015/0155596 A1 | 6/2015 | Gardner |
| 2015/0280185 A1 | 10/2015 | Lampe-Onnerud et al. |
| 2015/0280274 A1 | 10/2015 | Deponte et al. |

FOREIGN PATENT DOCUMENTS

| | | |
|---|---|---|
| EP | 1835251 A1 | 9/2007 |
| JP | 10233237 | 9/1998 |
| JP | 2000-106215 | 11/2000 |
| JP | 2000-331661 | 11/2000 |
| JP | 2003-223871 | 8/2003 |
| JP | 2004-527886 | 9/2004 |
| JP | 2012174434 | 9/2012 |
| KR | 2008047637 | 5/2008 |
| WO | 0039868 | 10/2000 |
| WO | 2005/011025 | 2/2005 |
| WO | 2009141348 A1 | 11/2009 |
| WO | 2015179625 A1 | 11/2015 |

OTHER PUBLICATIONS

Extended European Search Report for EP Application 10778347.4 dated Jul. 5, 2013, 10 pgs.
Office Action for Japanese Application No. 2012-512000 dated Jul. 16, 2013, 4 pgs.
EP 16185261.9 Extended European Search Report dated Apr. 6, 2017.

* cited by examiner

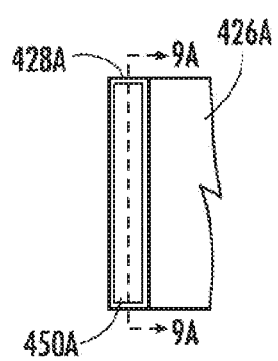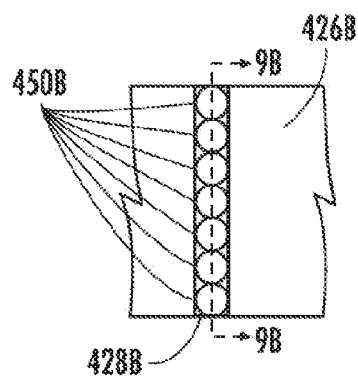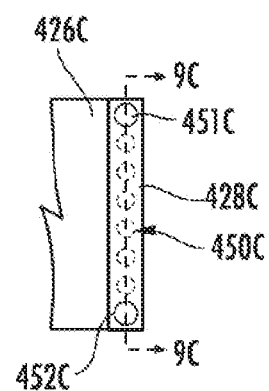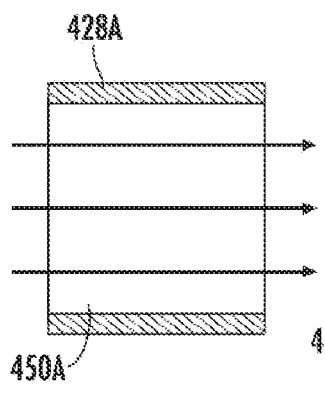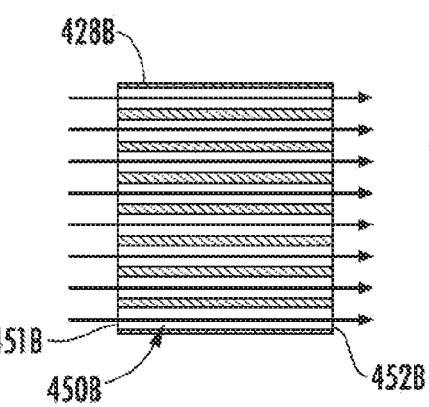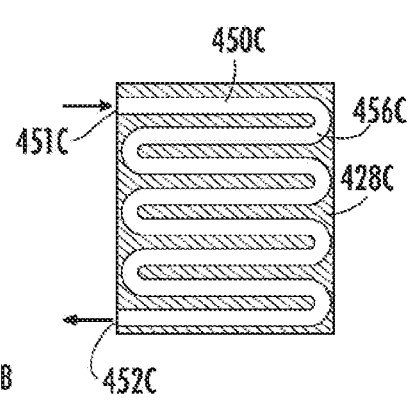

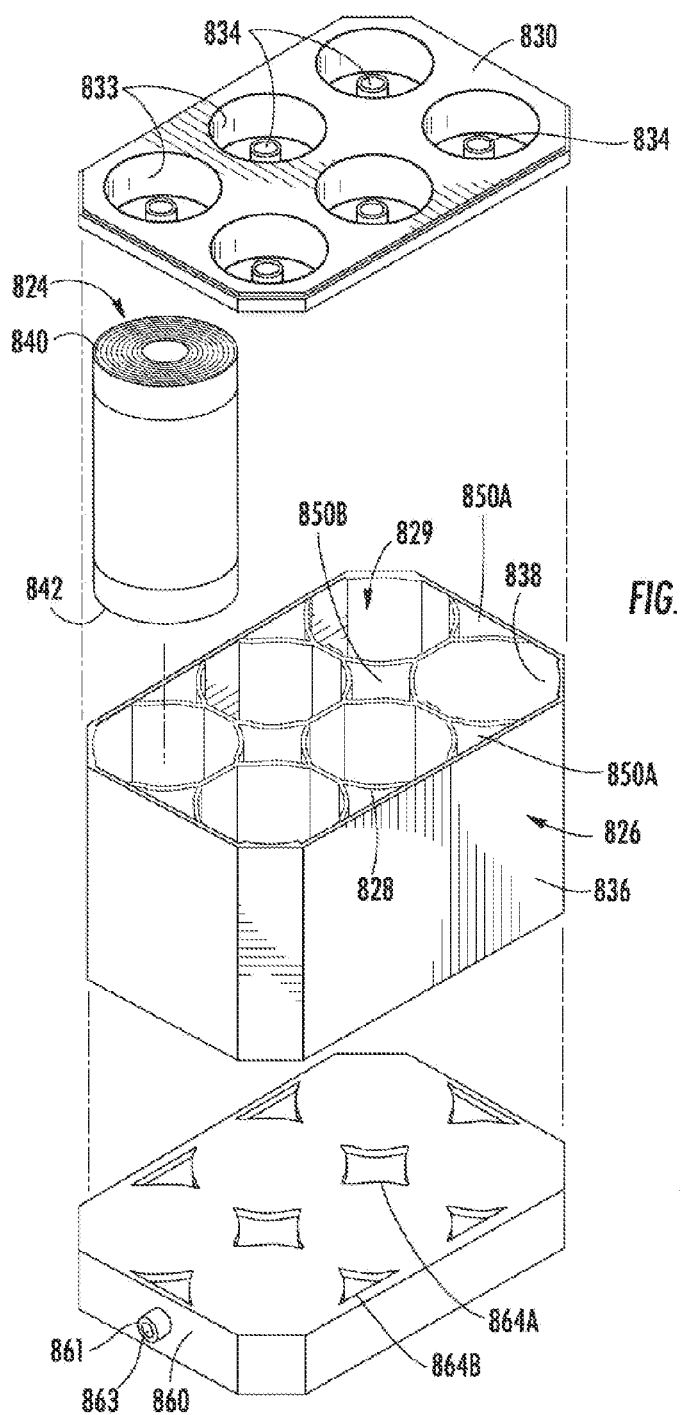
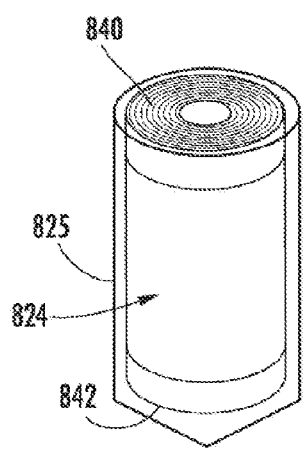
FIG. 15
FIG. 15A

LITHIUM ION BATTERY MODULE HAVING A COMPARTMENTALIZED HOUSING

CROSS REFERENCE TO RELATED APPLICATIONS

This application is a continuation of U.S. patent application Ser. No. 14/930,443, filed on Nov. 2, 2015, which is a continuation of U.S. patent application Ser. No. 13/300,300, filed on Nov. 18, 2011, now U.S. Pat. No. 9,209,483, which is a continuation of international Patent Application No. PCT/US2010/035451, filed May 19, 2010, which claims the benefit of and priority to U.S. Provisional Patent Application No. 61/180,043, filed May 20, 2009, all of which are hereby incorporated by reference in their entirety for all intents and purposes.

BACKGROUND

The present application relates generally to the field of batteries and battery systems. More Specifically, the present application relates to batteries and battery system that may be used in vehicle application to provide at least a portion of the motive power for the vehicle.

Vehicles using electric power for all or a portion of their motive power (e.g., electric vehicles (EVs), hybrid electric vehicles (HEVs), plug-in hybrid electric vehicles (PHEVs), and the like, collectively referred to as "electric vehicles") may provide a number of advantages as compared to a more traditional gas-powered vehicles using internal combustion engines. For example, electric vehicles may produce fewer undesirable emission products and may exhibit greater fuel efficiency as compared to vehicles using internal combustion engines (and, in some cases, such vehicles may eliminate the use of gasoline entirely, as in the case of certain types of PHEVs).

As electric vehicle technology continues to evolve, there is a need to provide improved power source (e.g., battery systems and modules) for such vehicles. For example, it is desirable to increase the distance that such vehicles may travel without the need to recharge the batteries. It is also desirable to improve the performance of such batteries and to reduce the cost associated with the battery systems.

One area of improvement that continues to develop is in the area of battery chemistry. Early electric vehicle systems employed nickel-metal-hydride (NiMH) batteries as a propulsion source. Over time, different additives and modifications have improved the performance, reliability, and utility of NiMH batteries.

More recently, manufacturers have begun to develop lithium-ion batteries that may be used in electric vehicles. There are several advantages associated with using lithium-ion batteries for vehicle applications. For example, lithium-ion batteries have a higher charge density and specific power than NiMH batteries. Stated another way, lithium-ion batteries may be smaller than NiMH batteries while storing the same amount of charge, which may allow for weight and space savings in the electric vehicle (or, alternatively, this feature may allow manufacturers to provide a greater amount of power for the vehicle within increasing the weight of the vehicle or the space taken up by the battery system).

It is generally know that lithium-ion batteries perform differently than NiMH batteries and may present design and engineering challenges that differ from those presented with NiMH battery technology. For example, lithium-ion batteries may be more susceptible to variations in battery temperature than comparable NiMH batteries, and thus systems may be used to regulate the temperatures of the lithium-ion batteries during vehicle operation. The manufacture of lithium-ion batteries also presents challenges unique to this battery chemistry, and new methods and systems are being developed to address such challenges.

It would be desirable to provide an improved battery module and/or system for use in electric vehicles that addresses one or more challenges associated with NiMH and/or lithium-ion battery systems used in such vehicles. It also would be desirable to provide a battery module and/or system that includes any one or more of the advantageous features that will be apparent from a review of the present disclosure.

SUMMARY

According to an exemplary embodiment, a lithium-ion battery module includes a housing having a plurality of partitions configured to define a plurality of compartments within the housing. The battery module also includes a lithium-ion cell element provided in each of the compartments of the housing. The battery module further includes a cover coupled to the housing and configured to route electrolyte into each of the compartments. The cover is also configured to seal the compartments of the housing.

According to an exemplary embodiment, a lithium-ion battery module includes a housing having a plurality of members configured to define a plurality of vessels within the housing. Each vessel is configured to receiving a lithium-ion cell element within the vessel. The battery module further includes a lid coupled to the housing and the plurality of members to seal the plurality of vessels of the housing. The lid is also configured to route electrolyte into each of the vessels.

BRIEF DESCRIPTION OF THE DRAWINGS

FIGS. 8A-8C are partial detailed views of thermal management features for a battery module according to various exemplary embodiments.

FIGS. 9A-9C are cross-sectional views along lines 9A, 9B, and 9C of FIGS. 8A, 8B, and 8C, respectively.

FIG. 15 is a partial exploded view of a battery module according to another exemplary embodiment.

FIG. 15A is a perspective view of a cylindrical cell element provided within a pouch according to an exemplary embodiment.

DETAILED DESCRIPTION

Figure 1:
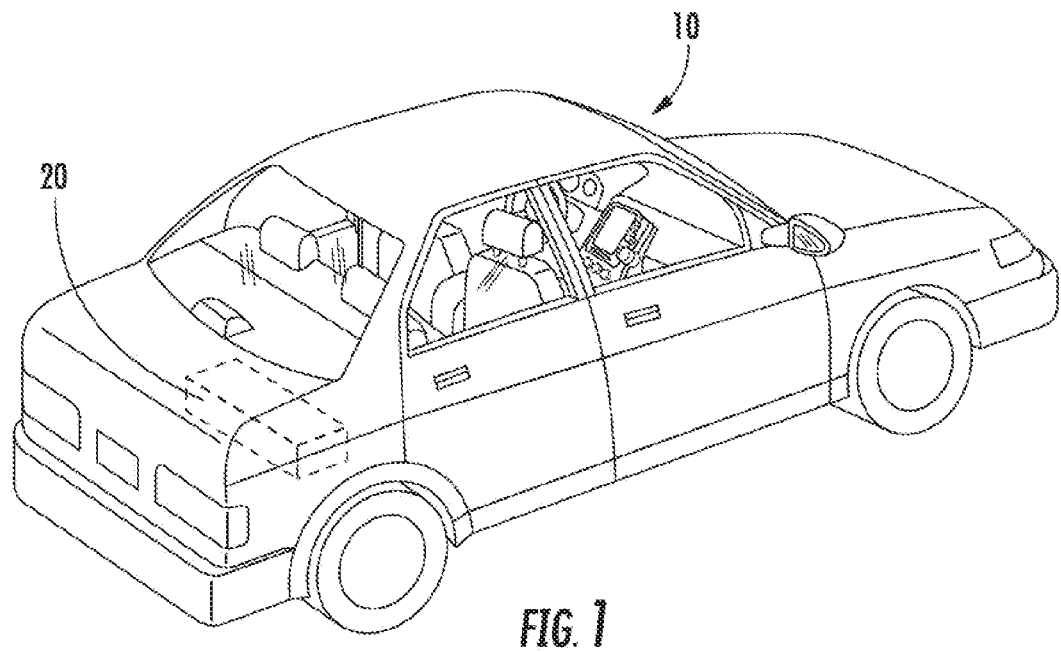
FIG. 1 is a perspective view of a vehicle including a battery system according to an exemplary embodiment.

FIG. 1 is a perspective view of a vehicle 10 in the form of an automobile (e.g., a car) having a battery system 20 for providing all or a portion of the motive power for the vehicle 10. Such a vehicle 10 can be an electric vehicle (EV), a hybrid, electric vehicle (HEV), a plug-in hybrid electric vehicle (PHEV), or other type of vehicle using electric power for propulsion (collectively referred to as "electric vehicles").

Although the vehicle 10 is illustrated as a car in FIG. 1, the type of vehicle may differ according to other exemplary embodiments, all of which are intended to fall within the scope of the present disclosure. For example, the vehicle 10 may be a truck, bus, industrial vehicle, motorcycle, recreational vehicle, boat, or any other type of vehicle that may benefit from the use of electric power for all or a portion of its propulsion power.

Although the battery system 20 is illustrated in FIG. 1 as being positioned in the trunk or rear of the vehicle, according to other exemplary embodiments, the location of the battery system 20 may differ. For example, the position of the battery system 20 may be selected based on the available space within a vehicle, the desired weight balance of the vehicle, the location of other components used with the battery system 20 (e.g., battery management systems, vents, or cooling devices, etc.), and a variety of other considerations.

Figure 2:
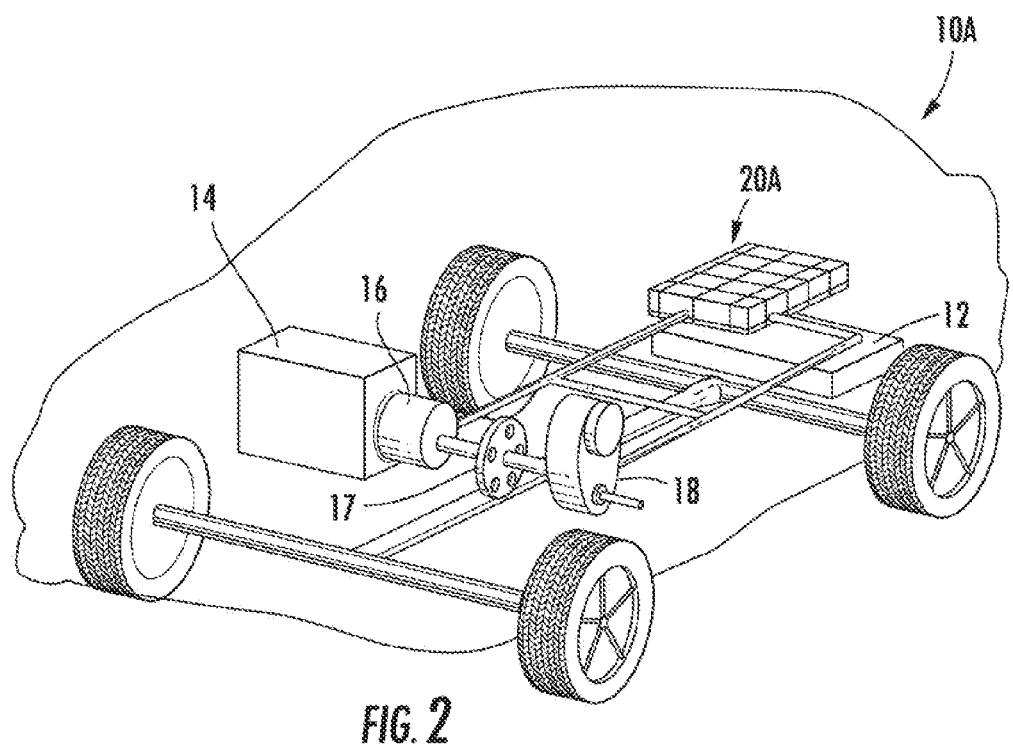
FIG. 2 is a cutaway schematic view of a vehicle including a battery system according to an exemplary embodiment.

FIG. 2 illustrates a cutaway schematic view of a vehicle 10A provided in the form of an HEV according to an exemplary embodiment. A battery system 20A is provided toward the rear of the vehicle 10A proximate a fuel tank 12 (the battery system 20A may be provided immediately adjacent the fuel tank 12 or may be provided in a separate compartment in the rear of the vehicle 10A (e.g., a trunk) or may be provided elsewhere in the vehicle 10A). An internal combustion engine 14 is provided for times when the vehicle 10A utilizes gasoline power to propel the vehicle 10A. An electric motor 16, a power split device 17, and a generator 18 are also provided as part of the vehicle drive system.

Such a vehicle 10A may be powered or driven by just the battery system 20A, by just the engine 14, or by both the battery system 20A and the engine 14. It should be noted that other types of vehicles and configurations for the vehicle drive system may be used according to other exemplary embodiments, and that the schematic illustration of FIG. 2 should not be considered to limit the scope of the subject matter described in the present application.

According to various exemplary embodiments, the size, shape, and location of the battery system 20, 20A, the type of vehicle 10, 10A, the type of vehicle technology (e.g., EV, HEV, PHEV, etc.), and the battery chemistry, among other features, may differ from those shown or described.

According to an exemplary embodiment, the battery system 20, 20A is responsible for packaging or containing electrochemical batteries or cell elements, connecting the electrochemical cell elements to each other and/or to other components of the vehicle electrical system, and regulating the electrochemical cell elements and other features of the battery system 20, 20A. For example, the battery system 20A may include features that are responsible for monitoring and controlling the electrical performance of the battery system 20, 20A, managing the thermal behavior of the battery system 20, 20A, containing and/or routing of effluent (e.g., gases that may be vented from a cell), and other aspects of the battery system 20, 20A.

Figure 3:
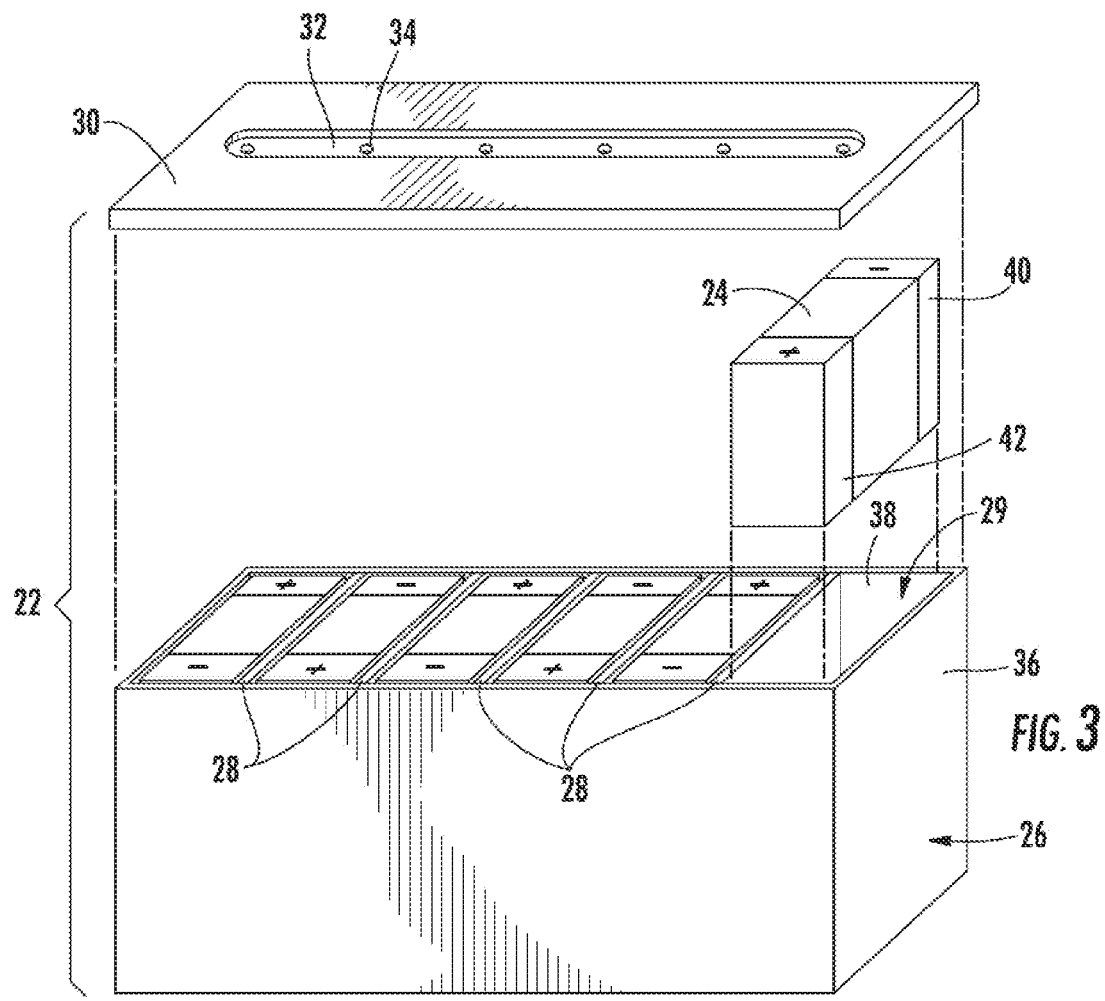
FIG. 3 is a partial exploded view of a battery module according to an exemplary embodiment.

Referring now to FIG. 3, a partially exploded view of a battery module 22 (e.g., battery pack, etc.) is shown according an exemplary embodiment. The battery module 22 includes a plurality of electrochemical cell elements 24 (which are shown schematically in FIG. 3). According to an exemplary embodiment, the electrochemical cell elements 24 may be, for example, lithium-ion cell elements, nickel-metal-hydride cell elements, lithium polymer cell elements, etc., or other types of electrochemical cell elements now known or hereafter developed. According to an exemplary embodiment, the electrochemical cell elements 24 are generally prismatic lithium-ion cell elements configured to store an electrical charge. According to other exemplary embodiments, cell elements 24 could have other physical configurations (e.g., oval, cylindrical, polygonal, etc.). The capacity, size, design, and other features of the cell elements 24 may also differ from those shown according to other exemplary embodiments.

Although illustrated in FIG. 3 as having a particular number of electrochemical cell elements 24 (i.e., six electrochemical cell elements), it should be noted that according to other exemplary embodiments, a different number and/or arrangement of electrochemical cell elements may be used depending on any of a variety of considerations (e.g., the desired power for the battery system, the available space within which the battery module must fit, etc.).

Figure 11:
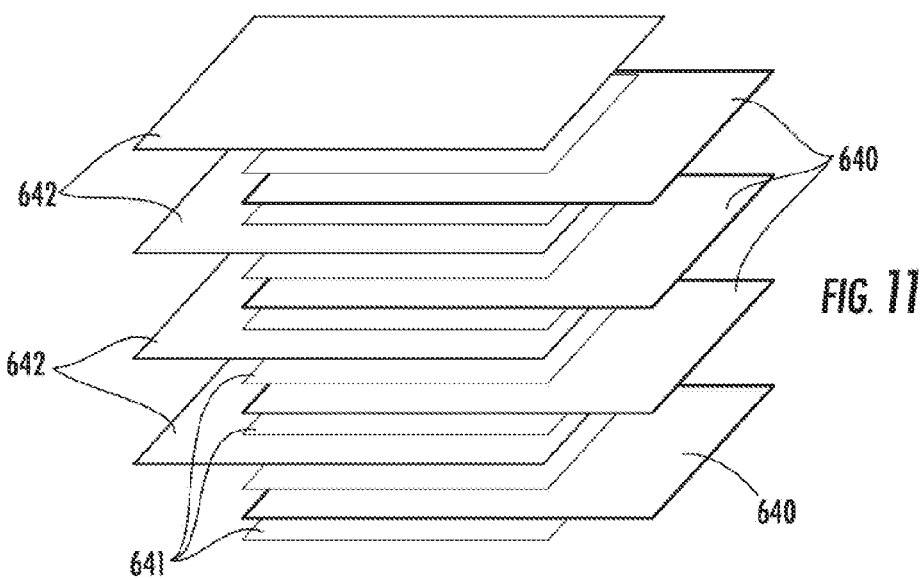
FIG. 11 is a partial exploded view of an electrode plate stack according to an exemplary embodiment.
Figure 12:
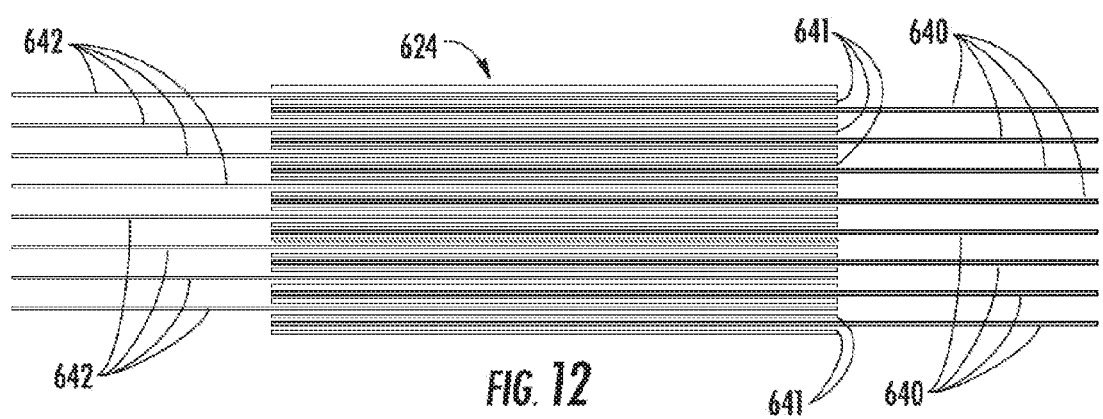
FIG. 12 is a side view of a electrode plate stack according to an exemplary embodiment.

According to an exemplary embodiment, each of the cell elements 24 includes a plurality of negative electrodes 40, positive electrodes 42, and separators alternatingly stacked together (such as, e.g., shown in FIGS. 11-12) to form the cell element 24 plate stack). As shown in FIGS. 11-12, a portion (e.g., edge) of each of the negative electrodes extend out from a first end of the plate stack and a portion (e.g., edge) of each of the positive electrodes extend out from a second end of the plate stack. It should be noted that the "−" and the "+" in FIG. 3 simply refer to the polarity of the collective edges or ends of the negative and positive electrodes 40, 42.

Still referring to FIG. 3, according to an exemplary embodiment, the battery module 22 includes a housing 26 having multiple members or partitions 28 (walls, dividers, barriers, panels, etc.). The multiple partitions 28 define a series of compartments 29 (e.g., vessels, sections, boxes, slots, openings, etc.) that are configured to receive the plurality of electrochemical cell elements 24. As shown in FIG. 3, each partition 28 extends from a first side wall of the housing 26 to a second side wall of the housing 26 to define the compartments 29. According to one exemplary embodiment, the partitions 28 extend to a top of the housing 26. According to other exemplary embodiments, the partitions 28 do not extend to the top of the housing 26 to provide room for connections to be made among the cell elements 24 (e.g., with bus bars or other similar elements).

According to an exemplary embodiment, a cover 30 may be provided to close the compartments 29. As shown in FIG. 3, according to one exemplary embodiment, the cover 30 includes a feature shown as a channel 32. The channel 32 is in fluid communication with a plurality of openings or apertures 34 that are in fluid communication with each of the compartments 29 of the housing 26.

According to one exemplary embodiment, the channel 32 and openings 34 are used to provide electrolyte into the compartments 29. For example, an electrolyte fill head (not shown) may be provided over the channel 32 and/or openings 34 to provide electrolyte to the compartments 29 at substantially the same time (i.e., the compartments 29 are filled with electrolyte at substantially simultaneously). According to one exemplary embodiment, the openings 34 are sealed (e.g., closed, blocked, etc.) after the compartments 29 have been filled with electrolyte (e.g., by a heat staking operation) such that the cover 30 seals the electrolyte within each of the compartments 29.

According to an exemplary embodiment, the housing 26, cover 30, and partitions 28 may be made of a polymeric material (e.g., polypropylene, polyethylene, etc.) or other suitable materials (e.g., electrically insulative materials). In this embodiment, the housing 26 and/or the cover 30 may include a permeability barrier (e.g., substance, material, film, covering, coating, etc.) to substantially restrict water or other substances from reaching the cell elements 24 and electrolyte. For ease of readability, the remainder of the application will reference the housing 26 having the permeability barrier; however, one of ordinary skill in the art will readily appreciate that the cover 30 may also have the permeability barrier.

As shown in FIG. 3, the permeability barrier may be provided on an outside of the housing 26 (indicated generally by reference number 36) or an inside of the housing 26 (e.g., inside each of the compartments 29, indicated generally by reference number 38). According to one exemplary embodiment, the permeability barrier 38 is provided only on the inside surfaces of the external walls of the housing 26 (i.e., not on the internal partitions 28). According to another exemplary embodiment, the permeability barrier 38 is also provided on the partitions 28.

According to an exemplary embodiment, the permeability barrier is provided, applied, sprayed, or coated onto the outer and/or inner surfaces of the housing 26. According to various exemplary embodiments, any suitable method of applying the permeability barrier to the housing 26 may be used, such as, for example, spraying, thermal spraying (e.g., plasma arc), dip coating, dry painting (e.g., power coating), wet painting, or an enamel painting process.

According to an exemplary embodiment the permeability barrier has a thickness in the range of about 50 microns to 1,000 microns. According to other exemplary embodiments, the thickness of the permeability barrier may be lesser or greater depending on the application. The permeability barrier may be a material with suitable water prohibiting properties. In various exemplary embodiments, the permeability barrier material comprises a metal oxide such as tin oxide, aluminum oxide, titanium oxide, zinc oxide, and/or zirconium oxide. One advantageous feature of using a metal oxide as the coating material is that the metal oxide prohibits intrusion of waters, is electrically insulative, and has a relatively high thermal conductivity.

According to an exemplary embodiment, the permeability barrier material includes metal oxide particles. According to one exemplary embodiment, the metal oxide particles have an average diameter in the range of about 10 microns to 50 microns. According to other exemplary embodiments, the average diameter of the metal oxide particles may be smaller or greater depending on the desired application, amount of electrical insulation, coating thickness, etc. According to an exemplary embodiment, the coating material is applied to the housing 26 in a powdered (dry) form. According to another exemplary embodiment, the permeability barrier material is applied to the housing in a liquid (wet) form (e.g., the metal oxide particles are suspended in a liquid binder or carrier material to form a paint-like substance).

According to another exemplary embodiment, the permeability barrier material may be provided on a surface of the housing 26 by thermal spraying (e.g., cold spraying, detonation spraying, flame spraying, high-velocity-oxygen-fuel coating spraying, plasma spraying, warm spraying, wire arc spraying, etc.). When using a thermal spraying process, the permeability barrier material (e.g., metal oxide) is provided in a powder or feedstock (i.e., wire) form and then heated or melted to a molten or semi-molten state (e.g., by combustion process, electrical arc discharge, etc.). The permeability barrier material (now in the form of droplets) is then sprayed (e.g., accelerated, propelled, etc.) onto the inner surfaces of the housing 26. Upon impacting or reaching the surfaces of the housing 26, the droplets of the permeability barrier material flatten, solidify, and form a coating or layer. It should be noted that the exact use and application of the thermal spraying processes may vary, as one of ordinary skill in the art would understand.

According to another exemplary embodiment, the permeability barrier material may be provided on the surfaces (e.g., external and/or internal surfaces) of the housing 26 by a dip coating process. According to an exemplary embodiment, the permeability barrier material (e.g., metal oxide) is mixed with a solvent of carrier material to form a liquid composition of permeability barrier coating material. According to an exemplary embodiment, the composition of permeability barrier coating material has a high content of water impermeable material (e.g., a high content of metal oxide particles to solvent or carrier material).

According to an exemplary embodiment the housing 26 is immersed in the permeability barrier coating material. According to one exemplary embodiment, the housing 26 is provided in the permeability barrier coating material only so far as to coat or cover the external surfaces of the housing 26. According to another exemplary embodiment, the housing 26 is fully immersed in the permeability barrier coating material to coat or cover both the external and internal surfaces of the housing 26. The housing is then pulled from the permeability barrier costing material, allowing the solvent to evaporate, with the permeability barrier coating material forming a thin layer on the surfaces of the housing 26. It should be noted that the exact use and application of the dip coating processes may vary, as one of ordinary skill in the art would understand.

According to another exemplary embodiment, the permeability barrier material may be provided on the surfaces of the housing 26 by applying a water impervious label or film to the housing 26. According to an exemplary embodiment, the permeability barrier material (e.g., a thin layer of metal)

is partially or fully coated with an adhesive material to form a label. According to an exemplary embodiment, the label (e.g., a layer of metal having the adhesive on it) is applied (e.g., affixed, spread over, attached, etc.) to the surfaces (e.g., external and/or internal) of the housing 26. It should be noted that the exact use and application of the painting processes may vary, as one of ordinary skill in the art would understand.

According to another exemplary embodiment the permeability barrier material may be provided on the surfaces of the housing by a painting process. According to an exemplary embodiment, the permeability barrier material (e.g., metal oxide) is mixed with a solvent or carrier material to form a paintable composition of permeability barrier material. According to an exemplary embodiment, the paintable composition of permeability barrier material has a high content of water impermeable material (e.g., a high content of metal oxide particles to solvent or carrier material). According to one exemplary embodiment, the permeability barrier material is spray painted onto the housing 26. According to another exemplary embodiment, the coating material is brush painted (e.g., by a hand held brush, by a rotary brush, etc.) onto the housing 26. It should be noted that the exact use and application of the painting processes may vary, as one of ordinary skill in the art would understand.

According to another exemplary embodiment, the coating material may be provided on the surfaces of the housing 26 by a powder coating process. According to an exemplary embodiment, the permeability barrier material (e.g., metal oxide particles) is provided in a powdered form and then electrostatically applied to the surfaces of the housing 26 (e.g., with an electrostatic gun, Corona gun, Tribo gun, fluidized bed, electrostatic magnetic brush, etc.). According to an exemplary embodiment, the permeability barrier material may be coated with a binder material (e.g., a polypropylene or polyethylene) prior to being applied to the housing 26. The housing 26, having the powdered coating on it, is then cured (e.g., at a temperature in the range of about 100-200 degrees Celsius) to allow the powder coating to melt (or semi-melt) and flow over the surfaces of the housing 26. It should be noted that the exact use and application of the powder coating process may vary, as one of ordinary skill in the art would understand.

According to another exemplary embodiment, the housing 26 and/or cover 30 may be constructed from a metallic material (e.g., such as aluminum, steel, etc.) or other suitable material and may not need a separate permeability barrier. In this embodiment, an electrically insulative material may be provided between the cell elements 24 and the metallic housing 26 and cover 30 to prevent direct contact between the cell elements 24 and the metallic housing 26 and cover 30.

Figure 3A:
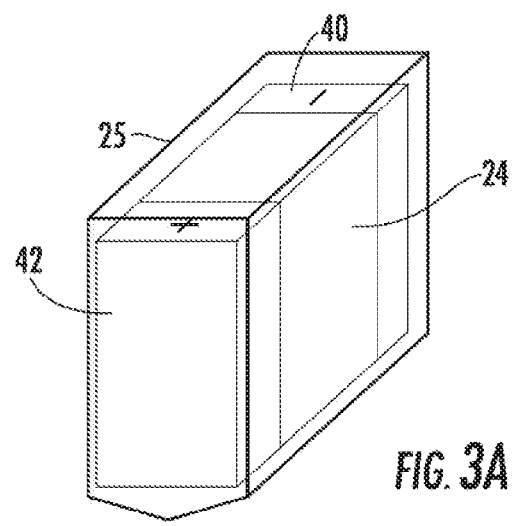
FIG. 3A is a perspective view of a prismatic cell element provided within a pouch according to an exemplary embodiment.

Referring now to FIG. 3A, according to another exemplary embodiment, each cell element 24 may be placed inside an optional pouch 25 (e.g., a metal foil pouch or a polymer pouch) before being provided in the housing 26. According to an exemplary embodiment, the pouch 25 acts as a permeability barrier (to restrict water intrusion) to the cell element 24 and/or electrolyte. According to one exemplary embodiment, the pouch 25 is open on the top side of the cell element 24 and closed on the bottom side of the cell element 24. According to another exemplary embodiment, the pouch 25 is closed (e.g., hermetically sealed) on both the top side and the bottom side of the cell element 24. According to an exemplary embodiment, an electrolyte may be provided inside the pouch 25 with the cell element 24. According to an exemplary embodiment, the pouch 25 is provided to replace the typical rigid, metal housing of a typical cell. Material costs can be saved by having the thin, flexible pouch 25 instead of the rigid, metal cell housing, or a separate permeability barrier coated to either the inside or outside the housing 26.

Figure 4:
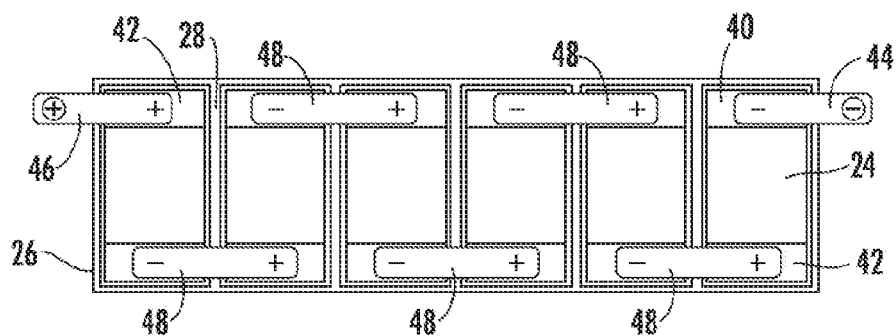
FIGS. 4, 5, and 6 are partial top views of a battery module according to various exemplary embodiments.
Figure 4A:
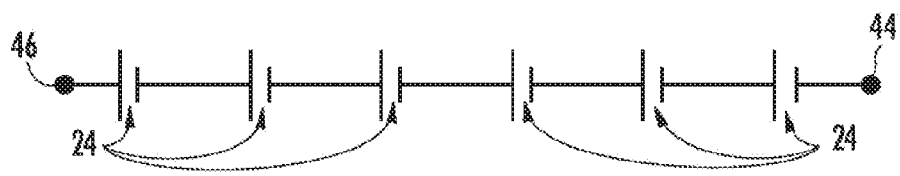
FIGS. 4A, 5A, and 6A are electrical schematic diagrams of the battery module shown in FIGS. 4, 5, and 6, respectively.
Figure 5:
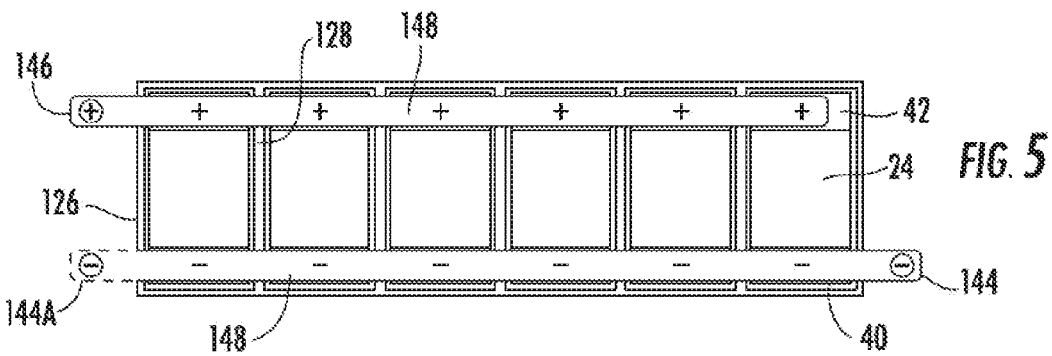
Figure 6:
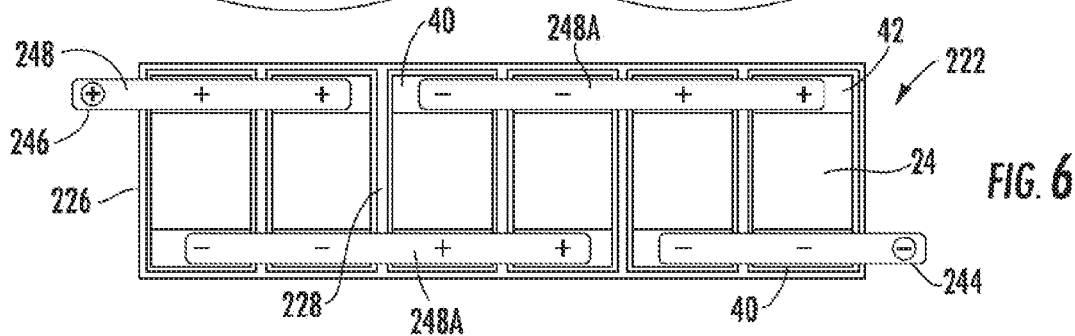

Referring now to FIGS. 4-6, according to an exemplary embodiment, each of the cell elements 24 are electrically coupled to one or more other cell elements 24 or other components of the battery system using connectors provided in the form of bus bars or similar elements. As can in seen in FIGS. 4-4A, the cell elements 24 are connected in series with one another by bus bars 48. According to an exemplary embodiment, the bus bars 48 are welded (e.g., ultrasonic welded, laser welded, etc.) to the respective electrodes 40, 42. The cell elements 24 are provided in an alternating sequence with the opposite polarity of the cell electrodes 40, 42 being adjacent one another to aid in connecting the cell elements 24 to one another. As seen in FIG. 4, a positive connection 46 is provided at one end of the battery module and a negative connection 44 is provided at the opposite end of the battery module.

Figure 5A:
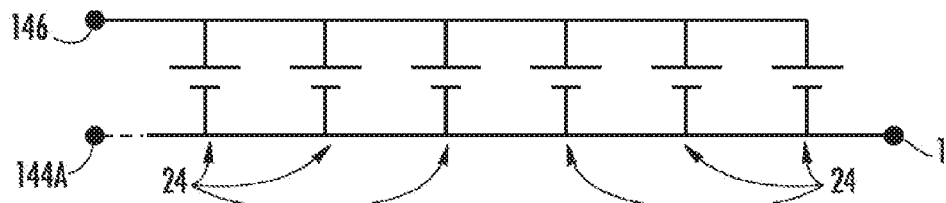

According to another exemplary embodiment, as shown in FIGS. 5-5A, the cell elements 24 are connected in parallel with one another. Bus bars 148 run along the entire set of cell elements 24, connecting together all of the positive electrodes 42 and negative electrodes 40, respectively. As seen in FIG. 5, a positive connection 146 is provided at one end of the battery module and a negative connection 144 is provided at the opposite end of the battery module. However, as shown in dashed lines, a negative connection 144A may be provided on the same end as the positive connection 146 according to another exemplary embodiment.

Figure 6A:
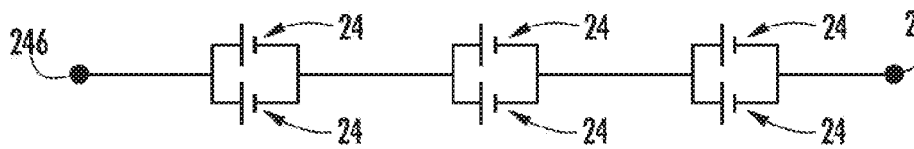

According to another exemplary embodiment as shown FIGS. 6-6A, the cell elements 24 are connected to one another in a combination of series and parallel. Bus bars 248 and 248A connect the cell elements 24 together such that there are three sets of parallel connected cell elements connected to one another in series. As shown in FIGS. 6-6A, there are two cell elements per each parallel set. As seen in FIG. 6, a positive connection 246 is provided at one end of the battery module and a negative connection 244 is provided at the opposite end of the battery module. According to other exemplary embodiments, other configurations and connection arrangements of the battery module are possible.

According to as exemplary embodiment, the various connectors or bus bars may be provided above the cell elements 24. According to another exemplary embodiment, the bus bars may be provided through a hole or opening (not shown) in the partitions to connect the sides of the cell elements 24 together. According to an exemplary embodiment, the cover 30 may include a recess (or other features) to accommodate the connections of the cell elements.

According to another exemplary embodiment, when the pouch 25 is used, an electrode or terminal of the cell element 24 may extend through the pouch 25 to be connected to an electrode or terminal of an adjacent cell element 24 (e.g., with a bus bar). According to another exemplary embodiment, a hermetic seal is provided around the terminal extending through the pouch 25. According to another exemplary embodiment, the pouch 25 (e.g., metal foil pouch) may serve as a terminal of the cell element 24. According to an exemplary embodiment, the pouch 25 may have either a negative or positive polarity (e.g., by being connected to either a negative or positive electrode of the cell element).

According to various exemplary embodiments, the battery module may also include features to provide thermal management or regulation (e.g., cooling and/or heating) of the cell elements (e.g., as shown and described in relation to FIGS. 7-16). For example, according to an exemplary embodiment, the housing and/or petitions may include a series of plates or extensions to provide conductive cooling and/or heating to the cell elements. In other exemplary embodiments, passages or tubes within the housing and/or partitions act to provide a space for a cooling and/or warming fluid (e.g., a gas or liquid) to flow near the cell elements. For ease of readability, the remainder of the application will reference cooling of the cell elements; however, one of ordinary skill in the art will readily appreciate that either cooling or heating of the cell elements may be accomplished with the exemplary embodiments described below.

Figure 7:
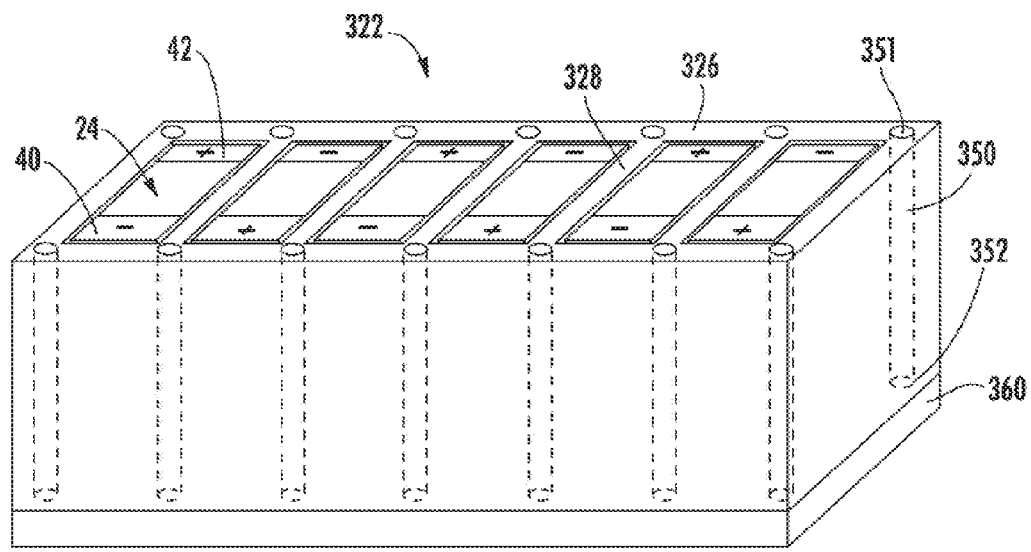
FIG. 7 is a partial perspective view of a battery module including a plurality of solid tubes utilized for thermal regulation according to an exemplary embodiment.

Referring to FIG. 7, a battery module 322 includes thermal management features to provide cooling to cell elements 24. As shown in FIG. 7, according to an exemplary embodiment, thermal management features shown as extensions or solid tubes 350 are provided in a generally vertical orientation inside the housing 326. According to an exemplary embodiment, the tubes 350 are located at each of the corners of the cell elements 24. According to another exemplary embodiment, the tubes 350 are located inside the partitions 328.

As shown in FIG. 7, according to an exemplary embodiment, a conductive member or plate 360 is attached to an end of each of the tubes 350. The conductive plate 360 acts as a heat sink to conductively cool the tubes 350, and thus the cell elements 24. According to an exemplary embodiment, heat may be carried away from the conductive plate 360 (e.g., via a cooling system (not shown).

Figure 7A:
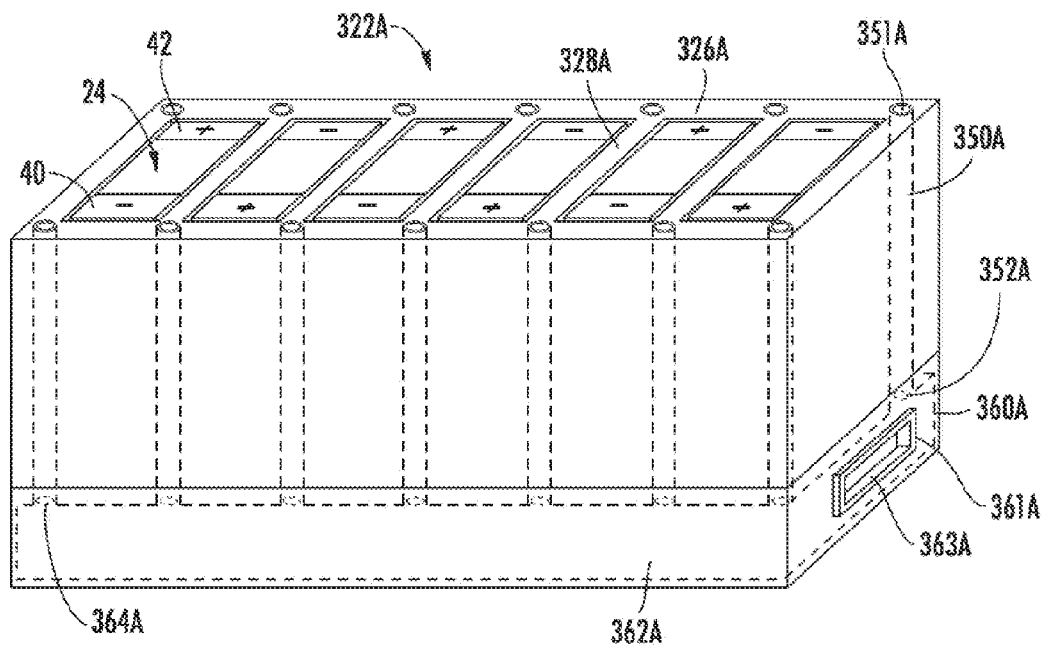
FIG. 7A is a partial perspective view of a battery module including a plurality of hollow tubes utilized for thermal regulation according to an exemplary embodiment.

As shown in FIG. 7A, according to another exemplary embodiment, hollow tubes 350A are used instead of solid tubes and are configured to have a fluid (e.g., a gas such as air or a liquid such as water or a water glycol mixture) pass therethrough to cool the cell elements 24A. According to one exemplary embodiment, the tubes 350A are hollow passages formed as part of the housing 326A and/or partitions 328A (e.g., formed inside a wall of the housing and/or partition). According to another exemplary embodiment, the tubes 350A are separate components that are placed inside the housing 326A and/or partitions 328A (e.g., the tubes 350A may be provided in preformed holes within a wall of the housing and/or partition). According to another exemplary embodiment, the tubes 350A (or passages) are provided in a generally horizontal orientation (i.e., as opposed to the generally vertical orientation as shown in FIG. 7A).

According to one exemplary embodiment, the flow of the fluid may be in one general direction (e.g., from the top of the housing to the bottom of the housing, or from the bottom of the housing to the top of the housing), with the ends of the cooling tubes connected by a manifold (e.g., such as manifold 360A shown in FIG. 7A). It should be noted that the manifold(s) may be provided above, below, or on either side of the housing 326. According to another exemplary embodiment, the tubes 350A may be interconnected to one another to provide a singular flow path for the fluid through the battery module. According to another exemplary embodiment, multiple interconnected tubes 350A may be provided in the battery module to provide multiple flow paths for the fluid through the battery module.

As shown in FIG. 7A, according to an exemplary embodiment, the manifold 360A includes an internal chamber 362A (plenum, space, area, etc.) that routes the fluid to/from openings 352A of the tubes 350A. At an opposite end of the tubes 350A, openings 351A may be similarly connected to a manifold (not shown). The manifold 360A includes a connection or flange 361A having an opening 363A in fluid communication with the internal chamber 362A of the manifold 360A. Fluid may be routed into/out of the opening 363A depending on the flow of the fluid.

Referring to FIGS. 8A-9C, several configurations of thermal management features for a battery module are shown according to various exemplary embodiments. As shown in FIGS. 8A and 9A, according to an exemplary embodiment, substantially an entire partition 428A of a housing 426A (of, e.g., battery module 22 shown in FIG. 3) may serve as a passage for cooling (or heating). For example, the partition 428A may have an internal hollow passage or space 450A configured to receive a fluid (e.g., a gas or a liquid) to cool the adjacent cell elements. According to another exemplary embodiment, the hollow space 450A is coupled to a manifold (such as, e.g., manifold 360A shown in FIG. 7A). It should be noted that the manifold(s) may be provided above, below, or on either side of the housing 426A. According to another exemplary embodiment, the partition 428A itself may be solid and serve as a cooling plate (e.g., by being coupled to an external cooling member (such as, e.g., conductive plate 360 shown in FIG. 7) to conductively cool the adjacent cell elements).

According to another exemplary embodiment, as shown in FIGS. 8B and 9B, the partition 428B may include a plurality of individual tubes or passages 450B that extend from a first side of battery housing to a second side of the battery housing (e.g., in either a generally horizontal or vertical orientation). These individual tubes 450B may be configured to receive a fluid (e.g., a gas or a liquid) to cool the adjacent cell elements.

According to an exemplary embodiment, the fluid in the individual tubes 450B may flow in the same direction from the first side of the battery housing to the second side of the battery housing (via inlet 451B to an outlet 452B as shown in FIG. 9B). According to another exemplary embodiment, the fluid in a first tube 450B may flow in a first direction, while the fluid in a second tube 450B may flow in a second direction opposite the first direction. According to one exemplary embodiment, the plurality of tubes 450B may be connected on either end of the partition 428B or housing 426B with a manifold (e.g., such as manifold 360A shown in FIG. 7A). It should be noted that the manifold(s) may be provided above, below, or on either side of the housing 426B. According to another exemplary embodiment, the manifold may extend across a side of the housing 426B to connect the tubes 450B of several of the partitions 428B together.

As shown in FIGS. 8C and 9C, according to another exemplary embodiment, the tubes 450C inside the partition 428C may be interconnected with one another in a serpentine fashion. For example, as shown in FIG. 9C, the tubes 450C are connected by corner portions 456C inside the partition 428C. According to another exemplary embodiment, the corner portions 456C may be provided outside the partition 428C (e.g., external to the partition 428C).

According to the exemplary embodiment shown in FIGS. 8C and 9C, the tube 450C has an inlet 451C and an outlet 452C located on the same side of the housing 426C. According to another exemplary embodiment, the inlet 451C and the outlet 452C may be located on opposite sides of the housing 426C. According to one exemplary embodiment, the inlets 451C of the tubes 450C from several partitions 428C may be connected together (e.g., by a manifold (not shown)) and the outlets 452C of the tube 450C from several partitions 428C may be connected together (e.g., by a manifold (not shown)). It should be noted that the manifold(s) may be provided above, below, or on either side of the housing 426C.

According to another exemplary embodiment, the tube (e.g., either tube 450B or tube 450C) of one partition may be singularly connected to the tube of a second partition, such that a single flow path for the fluid through the housing is created. For instance, the outlet of a tube from a first partition may be connected to the inlet of a tube from a second partition, with the outlet of the tube from the second partition connected to the inlet of a cooling tube from a third partition, and so on.

Figure 10:
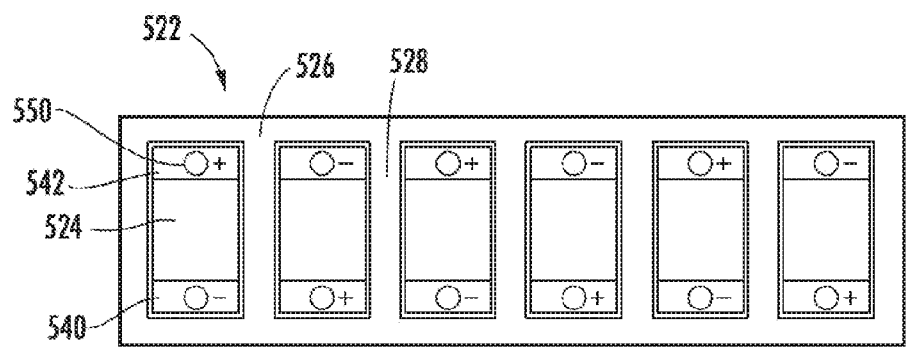
FIG. 10 is a top view of a battery module including tubular current collectors according to an exemplary embodiment.

Referring now to FIG. 10, a battery module is shown according to another exemplary embodiment as including cell elements 524 having integral tubes 550. According to an exemplary embodiment, the tubes 550 are coupled with the cell electrodes (e.g., negative electrode 540 and positive electrode 542) and function as current collectors for the cell elements 524. According to another exemplary embodiment, the tubes 550 may also serve as terminals for the cell elements 524. Having the tubes 550 integral with the cell elements 524 reduces the overall number of components used with the battery module 522, saving time and money in assembling and producing the battery module 522.

Referring now to FIGS. 11-12, a cell element 624 is shown according to an exemplary embodiment prior to having the tube (e.g., such as tube 650 shown in FIG. 13) coupled to the cell element 624. The cell element 624 includes multiple layers of positive electrodes 642 and negative electrodes 640 alternatingly layered together. Separators 641 are placed in between each electrode layer and may be constructed from a nonconductive material (e.g., porous polymeric material) in order to insulate the positive and negative electrodes from one another. According to an exemplary embodiment, the edges of the positive electrodes 642 extend out on one side of the cell element 624 while the edges of the negative electrodes 640 extend out from an opposite end of the cell element 624.

Figure 13:
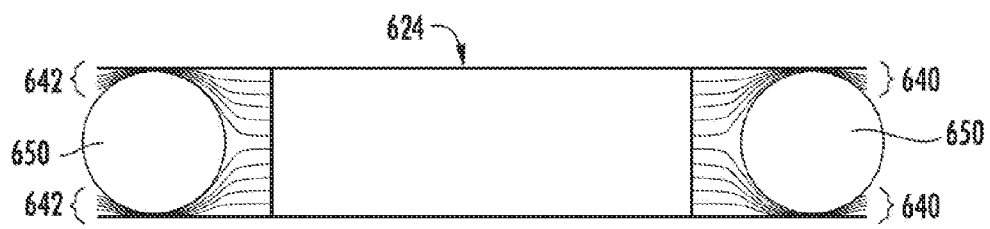
FIG. 13 is a top view of a cell element having tubular current collectors according to an exemplary embodiment.

As shown in FIG. 13, a tube 650 is coupled to each edge or end of the cell element 624 such that each tube 650 is coupled either to the negative electrodes 640 or the positive electrodes 642. According to one exemplary embodiment, the tube 650 parts the edges of the electrodes 640, 642 such that the tube 650 is generally located in the center of the edges of the electrodes (i.e., substantially half of the edges of the electrodes are on one side of the tube and substantially half of the edges of the electrodes are on the other side of the tube).

According to an exemplary embodiment, the edges of the electrodes 640, 642 are welded (e.g., by ultrasonic welding, laser welding, etc.) to the tubes 650. According to an exemplary embodiment, the tubes 650 may be welded substantially along the entire length of the tubes 650 from a first end (e.g., top) of the cell element 624 to a second end (e.g., bottom) of the cell element 624. According to other exemplary embodiments, the weld may extend along only a portion of the height of the cell element 624. According to another exemplary embodiment, the weld may be an intermittent weld along the height of the cell element 624.

Figure 13A:
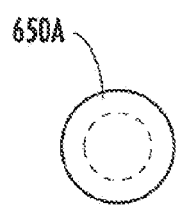
FIGS. 13A-13E are cross-sectional views of tubular current collectors that may be used with the cell element shown in FIG. 13 according to various exemplary embodiments.
Figure 13B:
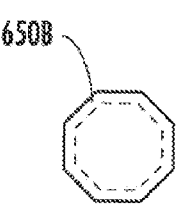
Figure 13C:
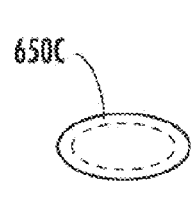
Figure 13D:
Figure 13E:

According to an exemplary embodiment, the tube may have a generally circular cross-section (e.g., as shown in FIGS. 13-13A). According to other exemplary embodiments, the tube may have other shapes (e.g., a hexagonal shape, an octagonal shape, or an oval shape as shown in FIGS. 13B-13E). According to another exemplary embodiment, the tube may be a solid tube (e.g., as shown in FIG. 13) and configured to be connected to a plate (such as, for example, plate 360 shown in FIG. 7) to provide conductive cooling (or heating) to the cell element. According to another exemplary embodiment, the tube may be a hollow tube (see, e.g., tubes 650A-E as shown in FIGS. 13A-13E) and configured to route a fluid therethrough (e.g., a gas such as air or a liquid such as water or a water/glycol mix).

Figures 14, 14A, 14B:
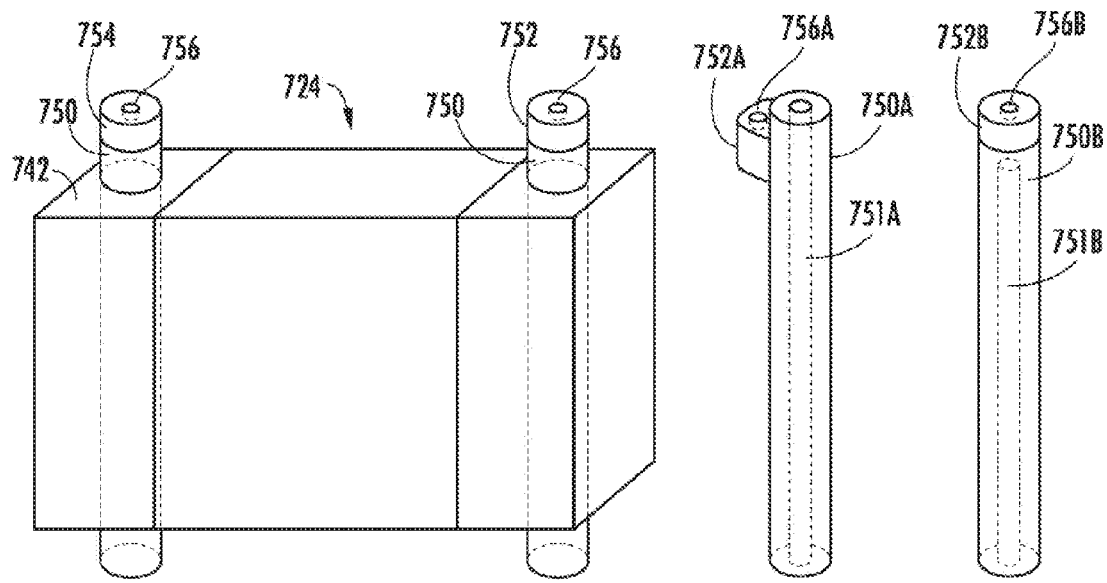
FIG. 14 is a perspective view of a cell element having tubular current collectors according to another exemplary embodiment.
FIGS. 14A-14B are perspective views of tubular current collectors that may be used with the cell element shown in FIG. 14 according to other exemplary embodiments.

Referring now to FIGS. 14-14B, a cell element 724 having integral tubes 750 is shown according to another exemplary embodiment. According to an exemplary embodiment, the tubes 750 may be solid tubes (e.g., as shown in FIG. 14). According to another exemplary embodiment, the tube may be a hollow tube having open ends at both ends of the tube (e.g., such as tube 750A having an internal passage 751A as shown in FIG. 14A). According to another exemplary embodiment, the tube may be a hollow tube having an open end at a first end of the tube and a closed end at a second end of the tube (e.g., such as tube 750B having an internal portion 751B as shown in FIG. 14B).

When the tubes are solid tubes (e.g., as shown in FIG. 14), the tubes may be coupled to a member or plate (such as, for example, plate 360 shown in FIG. 7) to provide conductive cooling (or heating) to the cell elements according to an exemplary embodiment. Additionally, the plate (e.g., a single, common plate) may be connected to the tubes of multiple cell elements within the battery module. According to one exemplary embodiment, an electrically insulative member is provided between the tubes and the plate. According to one exemplary embodiment, the plate is located below the cell elements. According to another exemplary embodiment, the plate is located above the cell elements.

When the tubes are hollow tubes (e.g., as shown in FIG. 14A), a fluid (e.g., a gas or a liquid) may enter the tubes (e.g., from a manifold, such as manifold 360A shown in FIG. 7A) to provide cooling (or heating) to the cell element according to an exemplary embodiment. In this embodiment, an electrically insulating film or coating may be provided within the hollow tube to electrically insulate the fluid from the tube (which acts as a current collector for the cell element). According to one exemplary embodiment, the fluid enters the bottom of the tube and exits the top of the tube. According to another exemplary embodiment, the fluid enters the top of the tube and exits the bottom of the tube.

According to one exemplary embodiment, the hollow tubes of multiple cell elements may be coupled together (e.g., by a manifold such as manifold 360A as shown in FIG. 7A). According to an exemplary embodiment, an inlet manifold connects the inlet ends of the tubes and an outlet manifold connects the outlet ends of the tubes. It should be noted that the manifold(s) may be provided above, below, or on either side of the housing. According to another exemplary embodiment, the individual tubes may be connected to one another (e.g., end-to-end) in order to create a single flow path for the cooling fluid through the battery module.

According to an exemplary embodiment, when the hollow tubes have at least one closed end (e.g., as shown in FIG. 14B), a fluid (e.g., a gas or a liquid) may enter the open end of the tubes in order to provide cooling (or heating) to the cell elements. According to an exemplary embodiment, the open ends of the tubes of multiple cell elements may be coupled together (e.g., by a manifold or conductive plate (not shown)).

Still referring to FIGS. 14A-14B, according to an exemplary embodiment, the tubes may act as terminals of the cell element 724. According to an exemplary embodiment, the terminal is located at an upper end of the tubes, but may be located elsewhere according to other exemplary embodiments. According to one exemplary embodiment, the terminal is an upper portion of the tube (e.g., terminals 752, 754, and 752B as shown in FIGS. 14 and 14B). According to another exemplary embodiment, the terminal may be a separate component that is coupled to the end of the cooling tube (e.g., terminal 752A as shown in FIG. 14A). According to an exemplary embodiment, the terminal may include a hole (e.g., threaded hole 756, 756A, 756B) for receiving a fastener used to couple a bus bar to the terminal.

Figure 16:
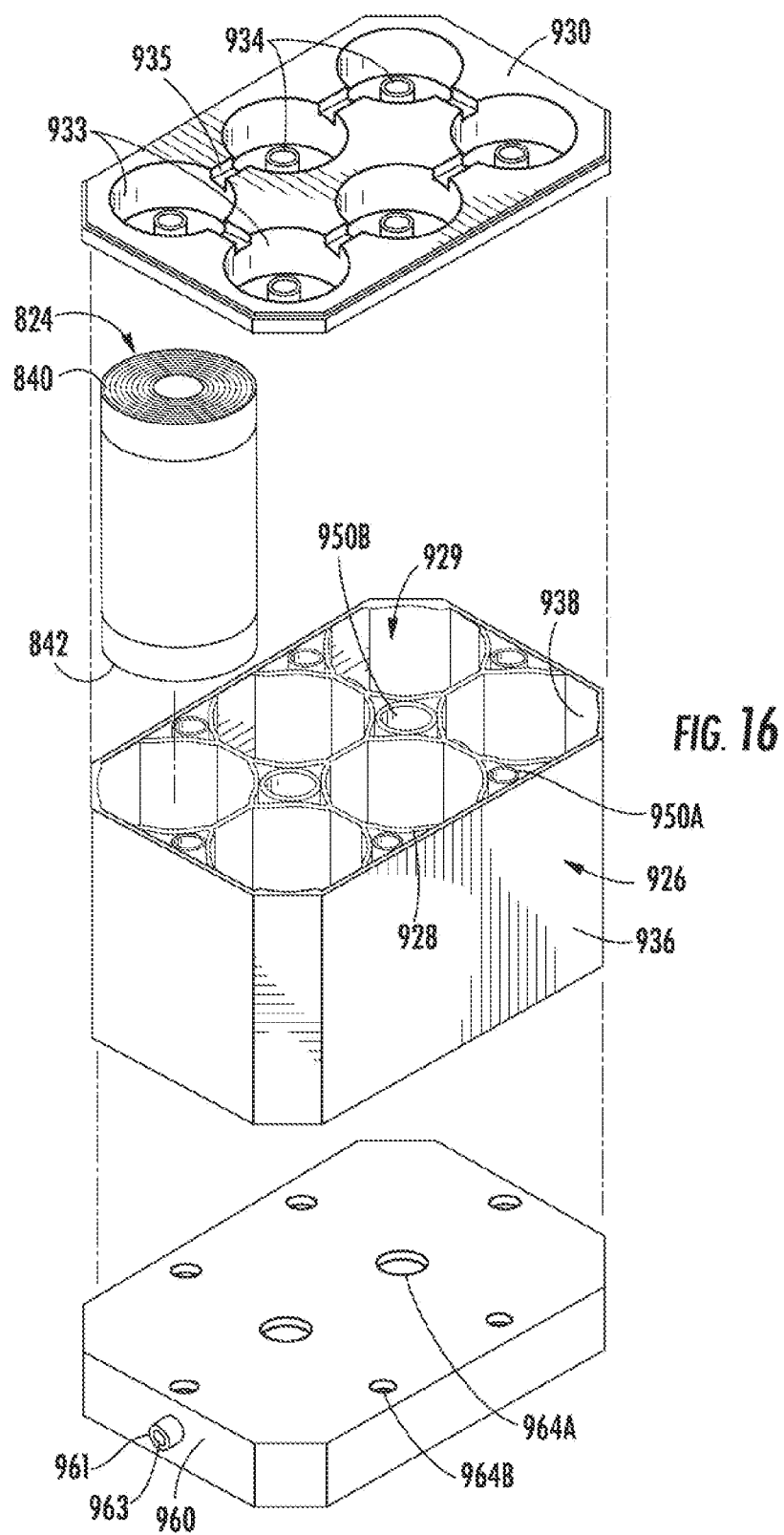
FIG. 16 is a partial exploded view of a battery module according to another exemplary embodiment.

Referring now to FIGS. 15-16, partially exploded views of battery modules or battery packs are shown according to two exemplary embodiments. The battery modules include a plurality of electrochemical cell elements 824 (e.g., lithium-ion cell elements, nickel-metal-hydride cell elements, lithium polymer cell elements, etc., or other types of electrochemical cell elements now known or hereafter developed). According to an exemplary embodiment, the electrochemical cell elements 824 are generally cylindrical lithium-ion cell elements configured to store an electrical charge. According to other exemplary embodiments, cell elements 824 could have other physical configurations (e.g., oval, prismatic, polygonal, etc.). The capacity, size, design, and other features of the cell elements 824 may also differ from those shown according to other exemplary embodiments.

Although illustrated in FIGS. 15-16 as having a particular number of electrochemical cell elements 824 (i.e., six electrochemical cell elements), it should be noted that according to other exemplary embodiments, a different number and/or arrangement of electrochemical cell elements 824 may be used depending on any of a variety of considerations (e.g., the desired power for the battery system, the available space within which the battery module must fit, etc.).

According to an exemplary embodiment, each of the cell elements 824 are electrically coupled to one or more other cell elements or other components of the battery system using connectors, bus bars, or similar elements (not shown). According to another exemplary embodiment, current collectors and/or terminals (not shown) of the cell elements 824 may be coupled to the negative electrode 840 and positive electrode 842 of the cell elements 824. According to an exemplary embodiment, the current collectors and/or terminals may be provided through a hole or opening (not shown) in the partitions to connect the ends of adjacent cell elements 824 together.

According to an exemplary embodiment, the battery modules include a housing 826, 926 having multiple members or partitions 828, 928 (walls, dividers, barriers, panels, etc.). The multiple partitions 828, 928 define a series of compartments 829, 929 (e.g., vessels, sections, boxes, slots, openings, etc.) that are configured to receive the plurality of electrochemical cell elements 824. A cover 830, 930 is provided to partially or completely surround or enclose the cell elements 824.

According to an exemplary embodiment, the housing, cover, and/or partitions may be made of a polymeric material (e.g., polypropylene) or other suitable materials (e.g., electrically insulative materials) and coated with a permeability barrier 836, 838 (similar to the permeability barrier as discussed above in regard to FIG. 3). According to another exemplary embodiment, the housing, cover, and/or partitions may be made of a metallic material (e.g., aluminum, steel, etc.) or other suitable materials and may not require a separate permeability barrier.

As shown in FIG. 15, according to one exemplary embodiment, the cover 830 include a plurality of features shown as recesses 833. Each recess 833 includes an opening or aperture 834 that is in fluid communication with one of the compartments 829 of the housing 826. According to one exemplary embodiment, the recesses 833 and openings 834 are used to provide electrolyte into the compartments 829. For example, an electrolyte fill head (not shown) may be provided over each recess 833 and/or openings 834 to provide electrolyte to the compartments 829. According to one exemplary embodiment, the fill head provides electrolyte to the compartments 829 at substantially the same time. According to one exemplary embodiment, the openings 834 are sealed (e.g., closed, blocked, etc.) after the compartments 829 have been filed with electrolyte (e.g., by a heat staking operation) such that the cover 830 seals the electrolyte within each of the compartments 829.

As shown in FIG. 16, according to another exemplary embodiment, the cover 930 includes a plurality of features shown as recesses 933 that are interconnected to one another by channels or slots 935. Similar to cover 830, each recess 933 includes an opening or aperture 934 that is in fluid communication with one of the compartments 929 of the housing 926. According to one exemplary embodiment, the recesses 933 and openings 934 are used to provide electrolyte into the compartments 929. For example, an electrolyte fill head (not shown) may be provided over at least one recess 933 and/or openings 934 to provide electrolyte to the compartments 929. The channels 935 allow electrolyte to flow from one recess 933 to another. According to one exemplary embodiment, the fill head provides electrolyte to the compartments 929 at substantially the same time. According to one exemplary embodiment, the openings 934 are sealed (e.g., closed, blocked, etc.) after the compartments 929 have been filled with electrolyte (e.g., by a heat staking operation) such that the cover 930 seals the electrolyte within each of the compartments 929.

Referring now to FIG. 15A, the cell element 824 may be placed inside an optional pouch 825 (e.g., a metal foil pouch or a polymer pouch) before being provided in the housing. According to one exemplary embodiment, the pouch 825 is open on the top side of the cell element 824 and closed on the bottom side of the cell 824. According to another exemplary embodiment, the pouch 825 is closed (e.g., hermetically sealed) on both the top side and the bottom side of the cell. According to an exemplary embodiment, an electrolyte may be provided inside the pouch with the cell element 824. According to an exemplary embodiment, the pouch 825 is provided to replace the typical rigid, metal housing of a cell. Material costs can be saved by having the thin, flexible pouch instead of the rigid, metal cell housing.

According to an exemplary embodiment, when the pouch 825 is used, the current collectors and/or terminals of the cell element may extend through the pouch 825 in order to be connected to the current collectors and/or terminals of an adjacent cell element. According to another exemplary embodiment, a hermetic seal is provided around the current collector and/or terminals extending through the pouch 825. According to another exemplary embodiment, the pouch 825 (e.g., metal foil pouch) may serve as a terminal of the cell element 824. According to an exemplary embodiment the pouch 825 may have either a negative or positive polarity (e.g., by being connected to either the negative electrode 840 or positive electrode 842 of the cell element 824).

Referring to FIGS. 15-16, according to an exemplary embodiment, the battery may also include features to provide cooling and/or heating of the cell elements. For example, according to an exemplary embodiment, the housing and/or partitions of the battery module may include a series of passages or tubes that act to provide cooling or heating to the cell elements. For ease of readability, the remainder of the application will reference cooling of the cell elements; however, one or ordinary skill in the art will readily appreciate that either cooling or heating of the cell elements may be accomplished with the exemplary embodiments described below.

Referring to FIG. 15, the battery module includes thermal management features shown as passages 850A, 850B according to an exemplary embodiment. As shown in FIG. 15, the passages 850A, 850B are formed by the partitions 828 within the housing 826. The battery module also includes a manifold 860 that includes openings or apertures 864A, 864B that are in fluid communication with the passages 850A, 850B. According to an exemplary embodiment, fluid is routed from the manifold 860 to the passages 850A, 850B to cool the adjacent cell elements 824. According to another exemplary embodiment, the fluid is routed from the passages 850A, 850B to the manifold 860. As shown in FIG. 15, the manifold 860 includes a connection 861 having an opening 863. According to another exemplary embodiment, a manifold (e.g., similar to manifold 860) may be provided at the ends of the passages 850A, 850B opposite the manifold 860 (e.g., to serve as an inlet or outlet manifold).

According to one exemplary embodiment, the flow of the fluid may be in one general direction (e.g., from the top of the housing 826 to the bottom of the housing 826, or from the bottom of the housing 826 to the top of the housing 826), with the ends of the passages 850A, 850B connected by a manifold (e.g., manifold 860). According to another exemplary embodiment, the passages 850A, 850B may be interconnected to one another to provide a singular flow path for the fluid through the battery module. According to another exemplary embodiment, multiple interconnected passages 850A, 850B may be provided in the battery module to provide multiple flow paths for the fluid through the battery module.

Referring now to FIG. 16, according to an exemplary embodiment, the battery models includes thermal management features shown as tubes 950A, 950B provided within the housing 926. According to one exemplary embodiment, the tubes 950A, 950B are separate components that are placed in between the partitions 928 forming the compartments 929. According to an exemplary embodiment, the tubes 950A, 950B are hollow tubes configured to receive a fluid (e.g., a gas or liquid). According to an exemplary embodiment, the tubes 950A, 950B are sized to efficiently utilize the space available in between the cell elements 824.

According to an exemplary embodiment, the battery module also includes a manifold 960 that includes openings or apertures 964A, 964B that are in fluid communication with the tubes 950A, 950B. According to an exemplary embodiment, fluid is routed from the manifold 960 to the tubes 950A, 950B to cool the adjacent cell elements 924. According to another exemplary embodiment, the fluid is routed from the tubes 950A, 950B to the manifold 960. As shown in FIG. 16, the manifold 960 includes a connection 961 having an opening 963. According to another exemplary embodiment, a manifold (e.g., similar to manifold 860) may be provided at the ends of the tubes 950A, 950B opposite the manifold 860 (e.g., to serve as an inlet or outlet manifold).

According to one exemplary embodiment, the flow of the fluid may be in one general direction (e.g., from the top of the housing 926 to the bottom of the housing 926, or from the bottom of the housing 926 to the top of the housing 926), with the ends of the tubes 950A, 950B connected by a manifold (e.g., manifold 960). According to another exemplary embodiment, the tubes 950A, 950B may be interconnected to one another to provide a singular flow path for the fluid through the battery module. According to another exemplary embodiment, multiple interconnected tubes 950A, 950B may be provided in the battery module to provide multiple flow paths for the fluid through the battery module.

According to one exemplary embodiment, the tubes 950A, 950B may be solid tubes and are configured to connect to a member or plate (not shown) located above or below the tubes 950A, 950B to provide conductive cooling to the cell elements.

As utilised herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that those terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the connector as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiment without departing from the scope of the present invention.

What is claimed is:

1. A lithium-ion battery module comprising:
    a housing having a plurality of compartments within the housing;
    a plurality of lithium-ion cell elements, one of the lithium-ion cell elements being provided in each of the compartments of the housing; and
    a cover coupled to the housing, wherein the cover is configured to seal each of the compartments of the housing; and
    a permeability barrier configured to block water from reaching the plurality of lithium-ion cell elements, wherein the permeability barrier comprises a plurality of metal foil pouches, wherein each metal foil pouch is disposed about a respective lithium-ion cell element, and wherein each metal foil pouch comprises an open end.

2. The battery module of claim 1, wherein the cover is configured to route electrolyte into each of the compartments, and the open end of each metal foil pouch is configured to receive the electrolyte routed into the corresponding compartment.

3. The battery module of claim 2, wherein the cover comprises a channel having a plurality of apertures in fluid communication with each of the compartments to facilitate routing of the electrolyte into each of the compartments through the plurality of apertures.

4. The battery module of claim 3, wherein the channel is defined by an upper surface of the cover.

5. The battery module of claim 1, wherein the housing further comprises solid tubes disposed along a perimeter of the housing and configured for thermal management of one or more of the cell elements, and the battery module further comprises a thermal conduction plate conductively coupled to the solid tubes.

6. The battery module of claim 1, wherein each metal foil pouch comprises:
    a top side proximate to one or more terminals of the corresponding lithium-ion cell element; and
    a bottom side disposed opposite to the top side, wherein the bottom side is closed.

7. The battery module of claim 6, wherein the top side of each metal foil pouch comprises the corresponding open end.

8. The battery module of claim 1, wherein each metal foil pouch is flexible and electrolyte is disposed inside each metal foil pouch.

9. The battery module of claim 1, wherein the housing does not comprise a metal permeability barrier.

10. The battery module of claim 1, wherein each lithium-ion cell element comprises a first electrode and a second electrode, and each lithium-ion cell element does not comprise a housing separate from the corresponding metal foil pouch.

11. A lithium-ion battery module comprising:
    a housing having a plurality of compartments within the housing;
    a plurality of lithium-ion cell elements, one of the lithium-ion cell elements being provided in each of the compartments of the housing;
    a cover coupled to the housing; and
    a permeability barrier configured to block fluid from passing therethrough, wherein the permeability barrier comprises a plurality of pouches, wherein each pouch is disposed about a respective lithium-ion cell element, and wherein each pouch comprises an open end.

12. The battery module of claim 11, wherein the cover is configured to route electrolyte into each of the compartments, and the open end of each pouch is configured to receive the electrolyte routed into the corresponding compartment.

13. The battery module of claim 12, wherein the cover comprises a channel having a plurality of apertures in fluid communication with each of the compartments to facilitate routing of the electrolyte into each of the compartments through the plurality of apertures.

14. The battery module of claim 13, wherein the channel is defined by an upper surface of the cover.

15. The battery module of claim 11, wherein the housing further comprises solid tubes disposed along a perimeter of the housing and configured for thermal management of one or more of the cell elements, and the battery module further comprises a thermal conduction plate conductively coupled to the solid tubes.

16. The battery module of claim 11, wherein each pouch comprises:
    a top side proximate to one or more terminals of the corresponding lithium-ion cell element; and
    a bottom side disposed opposite to the top side, wherein the bottom side is closed.

17. The battery module of claim 16, wherein the top side of each pouch comprises the corresponding open end.

18. The battery module of claim 11, wherein each pouch is flexible and electrolyte is disposed inside each pouch.

19. The battery module of claim 11, wherein the housing does not comprise a metal permeability barrier.

20. The battery module of claim 11 wherein each lithium-ion cell element comprises a first electrode and a second electrode, and each lithium-ion cell element does not comprise a housing separate from the corresponding pouch.

* * * * *

UNITED STATES PATENT AND TRADEMARK OFFICE
CERTIFICATE OF CORRECTION

PATENT NO. : 9,774,020 B2
APPLICATION NO. : 15/048754
DATED : September 26, 2017
INVENTOR(S) : Jason D. Fuhr et al.

Page 1 of 3

It is certified that error appears in the above-identified patent and that said Letters Patent is hereby corrected as shown below:

On the Title Page

Item [72], delete "Alex" and insert -- Alex A. --.

In the Specification

Column 1, Line 8, delete "2015," and insert -- 2015, now Pat. No. 9,577,231, --.

Column 1, Line 21, delete "Specifically," and insert -- specifically, --.

Column 1, Line 60, delete "within" and insert -- without --.

Column 1, Line 63, delete "know" and insert -- known --.

Column 2, Line 31, delete "to" and insert -- for --.

Column 2, Line 63, delete "views" and insert -- views taken --.

Column 3, Line 3, delete "a electrode" and insert -- an electrode --.

Column 3, Line 30, delete "hybrid," and insert -- hybrid --.

Column 4, Line 17, delete "20A" and insert -- 20, 20A --.

Column 4, Line 25, delete "an" and insert -- to an --.

Column 4, Line 53, delete "24" and insert -- 24 (e.g., --.

Column 5, Line 59, delete "embodiment" and insert -- embodiment. --.

Signed and Sealed this
Eighth Day of January, 2019

Andrei Iancu
*Director of the United States Patent and Trademark Office*

CERTIFICATE OF CORRECTION (continued)
U.S. Pat. No. 9,774,020 B2

Column 6, Line 3, delete "waters," and insert -- water, --.

Column 6, Line 42, delete "solvent of" and insert -- solvent or --.

Column 6, Line 48, delete "embodiment" and insert -- embodiment. --.

Column 6, Line 57, delete "costing" and insert -- coating --.

Column 7, Line 9, delete "embodiment" and insert -- embodiment. --.

Column 7, Line 11, delete "housing" and insert -- housing 26 --.

Column 8, Line 11, delete "can in" and insert -- can be --.

Column 8, Line 47, delete "as" and insert -- an --.

Column 9, Line 6, delete "petitions" and insert -- partitions --.

Column 10, Line 7, delete "Referring" and insert -- Referring now --.

Column 10, Line 67, delete "tube" and insert -- tubes --.

Column 12, Line 47, delete "as shown" and insert -- shown --.

Column 12, Line 64, delete "FIGS. 14A-14B," and insert -- FIGS. 14-14B, --.

Column 12, Line 67, delete "tubes," and insert -- tube, --.

Column 12, Line 67, delete "tubes," and insert -- tube, --.

Column 14, Line 12, delete "filed" and insert -- filled --.

Column 14, Line 51, delete "element" and insert -- element 824 --.

Column 14, Line 55, delete "collector" and insert -- collectors --.

Column 14, Line 58, delete "embodiment" and insert -- embodiment, --.

Column 15, Line 3, delete "one or" and insert -- one of --.

Column 15, Line 38, delete "models" and insert -- module --.

Column 16, Line 18, delete "those" and insert -- these --.

Column 17, Line 3, delete "embodiment" and insert -- embodiments --.

In the Claims

In Column 17, Line 11, Claim 1, delete "housing; and" and insert -- housing; --.